United States Patent [15] 3,697,083

Ban [45] Oct. 10, 1972

[54] TAPE PLAYER UTILIZING PLURALITY OF ENDLESS MAGNETIC TAPE CARTRIDGES

[72] Inventor: Itsuki Ban, 829 Higashi-Oizumimachi, Tokyo-to, Japan

[22] Filed: Jan. 19, 1970

[21] Appl. No.: 3,916

[30] Foreign Application Priority Data

Jan. 22, 1969 Japan ........................44/4059

[52] U.S. Cl. ..............................274/4 F, 179/100.2 Z

[51] Int. Cl. ..........................G11b 23/12, G11b 23/06

[58] Field of Search ..........274/4 F, 11 B, 11 C, 11 E; 179/100.2 Z; 242/197–200

[56] References Cited

UNITED STATES PATENTS

| | | | |
|---|---|---|---|
| 2,539,521 | 1/1951 | Owens | 274/4 F |
| 3,127,178 | 3/1964 | Osborne | 274/4 F |
| 3,524,949 | 8/1970 | Kleve | 274/4 F |
| 3,525,086 | 8/1970 | Lichowsky | 274/4 F |

*Primary Examiner*—Leonard Forman
*Assistant Examiner*—Dennis A. Dearing
*Attorney*—Jacobs & Jacobs

[57] ABSTRACT

A tape player utilizing a plurality of endless magnetic tape cartridges, comprising a rotatable container accommodating the plurality of endless magnetic tape cartridges, a container latch means for arresting rotation of the container to position the cartridge to be played in a predetermined position, a swingable reciprocating deck provided with a capstan and a reproducing member for playing the cartridge held in the playing position such as a magnetic head or the like, a deck latch means for retaining the reciprocating deck at a position where the cartridge in the playing position is played, a tension spring for moving the reciprocating deck which has been released from the deck latch means to the direction away from the cartridge, a deck moving means moving the cartridge to a position where it is played by rotation of the capstan against the bias of the tension spring, and a means for positioning another cartridge in the playing position by rotation of the capstan while the deck is being moved by the deck moving means to a position where the cartridge is played whereby the cartridge is suitably played by controlling rotation of the container and movement of the reciprocating deck.

8 Claims, 4 Drawing Figures

TAPE PLAYER UTILIZING PLURALITY OF ENDLESS MAGNETIC TAPE CARTRIDGES

BACKGROUND OF THE INVENTION

This invention relates to a tape player utilizing a plurality of endless magnetic tape cartridge and more particularly to such a tape player utilizing a plurality of endless magnetic tape cartridges wherein the cartridges are received in a rotatable container, one cartridge out of them being brought to the playing position by controlling rotation of the container and played by controlling movement of a slidable reciprocating deck having reproduction members such as a capstan, magnetic head or the like.

Proposals have been made heretofore to provide a tape player wherein a plurality of endless magnetic tape cartridges are accommodated in a container or the like to play one of them upon selection thereof.

One type of such tape players is that one cartridge is located in a predetermined playing position by movement of the container containing a plurality of cartridges and the cartridge in the playing position is played by movement of the deck having reproducing members such as capstan, magnetic head toward the deck. Generally, movement of the deck is effected by the use of an electromagnetic plunger. The deck is usually heavy and massive due to the reproducing members provided therewith. And, the movement distance of the deck is required to be 20mm so that the electromagnetic plunger to be used should be of large dimensions and great power consumption. Particularly, in the case of employment of the battery as power source, it is substantially impossible to use the electromagnetic plunger of great power consumption. Further, it is undesirable to move the deck in pulse fashion by means of the electromagnetic plunger.

According to the present invention, a tape player is provided in which the deck is moved without use of the electromagnetic plunger and of a particular drive source such a motor or the like served for only movement of the deck thereby requiring less power consumption and enabling manufactures to be low cost.

SUMMARY OF THE INVENTION

It is a primary object of the invention to provide a tape player utilizing a plurality of endless magnetic tape cartridges wherein the plurality of the cartridges are accommodated in a container, a desired cartridge is brought to a predetermined playing position by controlling rotation of the container, and the cartridge in the playing position being played by moving a slidable reciprocating deck carrying reproduction members such as a capstan, magnetic head or the like.

Another object of the invention is to provide a tape player utilizing a plurality of endless magnetic tape cartridges wherein movement of the reciprocating deck is effected by rotation of the capstan and at least one tension spring.

Still another object of the invention is to provide a tape player utilizing a plurality of endless magnetic tape cartridges, which is compact as well as simple in its construction with requiring less power consumption.

A further object of the invention is to provide a tape player utilizing a plurality of endless magnetic tape cartridges wherein rotation of the container is effected by rotation of the capstan without use of a specific drive source for drivingly rotating the container.

Still further object of the invention is to provide a tape player utilizing a plurality of endless magnetic tape cartridges wherein retention of the container and the reciprocating deck is controlled in relation to operation of a common electromagnetic plunger, the deck is moved from a position playing the cartridge by the bias of the tension spring upon disengagement of the deck at the same time retention of the container is released to rotate the container.

Yet another object of the invention is to provide a tape player utilizing a plurality of endless magnetic tape cartridges wherein the current supply to the electrical plunger is controlled by a rotary switch rotatable synchronously with the container and by cartridge selecting switches designating the cartridge to be played.

Further objects and additional advantages of the invention will become apparent from the following description and accompanying drawings, wherein:

DESCRIPTION OF THE PREFERRED EMBODIMENTS

Figure 1:
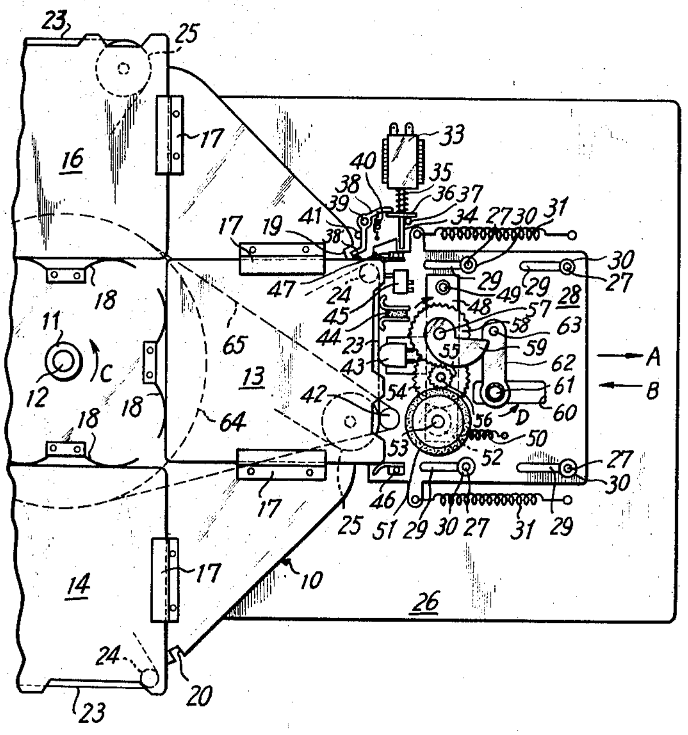
FIG. 1 is a plan view of a tape player utilizing a plurality of endless magnetic tape cartridges embodying the present invention, partially broken away.

Referring to the drawings, particularly to FIG. 1, a tape player utilizing a plurality of endless magnetic tape cartridges, according to the present invention, is shown to include a flat and rotary container 10 to which a plurality of cartridges are horizontally and radially mounted. The container 10 shown as being partially broken away in FIG. 1 is substantially octagonal and is rotatably supported by a sleeve 11 over an axis mounted to a bottom plate of a player housing (not shown) at the center of the container. The container 10 is adapted to receive four endless magnetic tape cartridges 13 to 16 (15 is on the broken part). Guide means 17 are suitably provided on the container 10 to receive the cartridges and these guide means 17 may comprise parallel spaced rails secured in upright extension to the container. The separation of the two portions of the guide means 17 is just sufficient to accommodate a tape cartridge in sliding relation between the guide means so that no possible canting or other undesirable motion of the cartridge is possible when same is inserted between the guide means upon the container 10. The cartridges 13 to 16 inserted between the guide means 17 each include a rear edge which abuts against a leaf spring 18 secured at the center thereof to the container 10. As shown, each cartridge is inserted in a manner that the leading edge thereof is projected from the periphery of the container. The container 10 is provided at the periphery thereof with four notches 19 to 22 (21, 22 are not shown) operation of which will be described later. The cartridges 13 to 16 each include a generally rectangular housing with a centrally disposed reel assembly (not shown) on which a magnetic tape 23 is wound and unwound in conventional manner. The endless tape 23 passes over a guide 24 and a pinch roller 25. The guides 24 and pinch roller 25 are disposed adjacent the leading edge of the cartridge whereat the cartridge side wall is cut away or disposed with and the tape 23 is extended from the center of the hub of the reel (not shown) about the guide 24 and thence about the pinch roller 25 back to the outer periphery of a roll formed by the tape wound about the hub.

Numeral 26 designate a base plate which is horizontally mounted in the player housing (not shown) and on which four vertical aligning rods 27 are mounted. The rod 27 is shown to be tapered to the uppermost end thereof. A reciprocating deck 28 is slidably supported and includes elongated slots 29 to receive each of the rods 27. Rings 30 are mounted on the respective rods 27 at each end thereof to prevent the deck 28 from being out of the rods and going upwardly and downwardly over the rods. The deck 28 is parallel to the base plate 26 and disposed to provide a space between the deck and the base plate 26. The deck 28 is given a movable force in the direction of arrow A by means of springs 31. FIG. 1 shows a situation where a hook portion 32 is engaged by an actuator 34 for an electromagnetic plunger 33 firmly mounted to the base plate 26 to hold the deck 28 in position against the bias of the springs 31. The actuator 34 for the plunger 33 is projected by the bias of a spring 35 to such a position, when the plunger is not energized, where a flange 36 on the actuator abuts against a stopper pin 37 on the base plate 26. A latch lever 38 has one end in engagement relationship with the flange 36 on the actuator and the other end interposed within one of the notches 19 to 22 and it is pivotaly mounted by a pin 39 to the base plate 26. The latch lever 38 is given a clockwise rotational force by a spring 40, however, rotation of the latch lever 38 is limited by a stopper pin 41 on the base plate 26. As seen from FIG. 1, the end 38' of the latch lever 38 is interposed in the notch 19 to prevent rotation of the container 10 while the cartridge 13 is held in the playing position. There are mounted on the deck 28 reproducing members for the cartridge in the playing position, such as a capstan 42, magnetic head 43, and an endmark detection or sensing means 44. The capstan 42 passes through a hole (not shown) in the deck 28 and upwardly extends from the deck 28. The capstan 42 is downwardly of the deck connected to a driving mechanism (not shown) including a motor (not shown) provided beneath the deck. Mounted on the deck 28 is an electrical switch 45 which, as will be described in detail later, is actuated by the front edge of the cartridge. Guides 46, 47 are also provided on the deck 28 to control the cartridge with respect to the deck 28 when the cartridge is held in the playing position.

A driving means for moving the deck 28 against the elastic force of the tension springs 31 includes a swing lever 48 swingably mounted on a shaft 49 on the deck 28. The swing lever 48 is urged in the counterclockwise direction by a spring 50. A rubber covered frictional wheel 51 and a gear 52 connected to each other are rotatably supported on an axis 53 on the swing lever 48. The frictional wheel 51 as will be described later is caused to abut against the capstan 42 by rotation of the swing lever 48 from the position as shown to the clockwise direction and is rotatably driven by the capstan. Integrally formed gear 54 and 55 are rotatably supported on an axis 56 on the swing lever 48. The gear 54 is adapted to mesh with the gear 52. Rotatably mounted on an axis 57 on the swing lever 48 are a gear 58 and a cam 59 which are connected with each other, with gear 58 meshing with the gear 55. The gears 52, 54, 55 and 58 constitute a reduction gearing and rotation of the frictional wheel 51 is reduced to be imparted to the cam 59.

A lever 62 is swingably mounted to a shaft 61 which is projected from the base plate 26 and upwardly extends through an opening 60 in the deck 28. As will be detailed later, a pin 63 is provided on the lever 62 to abut against the cam 59. The lever 62 is urged round the shaft 61 in the direction of arrow D by an actuable spring (not shown), however, rotation of the lever 62 due to the spring (not shown) is arrested by a stopper member (not shown) and then is held in the position as shown.

Means for rotatably driving the container 10 includes a pulley 64 mounted to the sleeve 12 common to the container, and a belt 65 interposed between the pulley 64 and the capstan 42. The belt 65 is adapted to be slackened when the deck 28 is in the position as shown, and is slipped over the pulley 64 and the capstan 42. As will be mentioned in detail later, when the deck 28 is moved from the position as shown to the direction of arrow A by the bias of the springs 31, the belt 65 is tensioned to impart a rotational force of the capstan 42 to the container 10 through the belt, the pulley 64, and the sleeve 11 to provide a rotational force in the direction of arrow C for the container.

Figure 2:
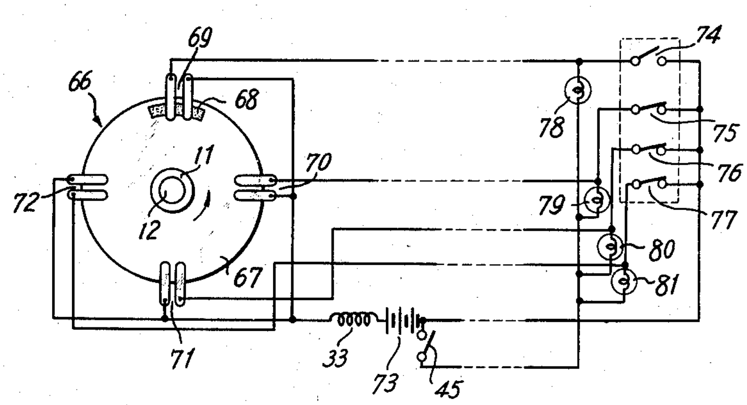
FIG. 2 is an electrical circuit diagram for controlling rotation of the container and the current supply to the electromagnetic plunger in FIG. 1.

FIG. 2 shows a control means for controlling not only supply of current of the electromagnetic plunger 33 but also retention of the deck 28 and for controlling rotation of the container 10 to locate the cartridge to be played in the playing position. In the drawing, similar numerals are used to illustrate like parts in FIG. 1.

The control means includes a rotary switching means 66. The rotary switching means 66 has rotary disk 67 made of insulating material tightly mounted on the sleeve 11 with the container 10 and the pulley 64 (FIG. 1). A conductive piece 68 is provided to the rotary disk 67 at the upper surface thereof. Switches 69 to 72 each consisting of a pair of contacts are mounted on a fixed member (not shown) of insulation, which is provided corresponding to the rotary disk 67. The switches 69 to 70 are spaced 90° apart from another and are successively closed by the conductive piece 68 due to rotation of the rotary disk 67 as the sleeve 11 is rotated. The contacts on the one hand with respect to the switches 69 to 72 are connected through the electromagnetic plunger 33 with the plus terminal of an electrical source 73 and the other contacts are respectively connected through cartridge selecting switches 74 to 77 provided corresponding to the cartridges 13 to 16 (FIG. 1) with the minus terminal of the source 73. The cartridge selecting switches 74 to 77 are provided for designating the cartridge to be played within the container 10 and they are so adapted that one which is manually operated is opened and the remainders are maintained in closed condition. Indicator lamps 78 to 81 are connected through the electrical switch 45, as shown, in parallel with associated cartridge selecting switches 74 to 77. It will be understood from the following description how the indicator lamps 78 to 81 functions. The switch 45 is adapted to open or close when the cartridge is actuated or deactuated.

A mode of operation and function of the tape player shown in FIGS. 1 and 2 will be described in detail hereinafter. FIG. 1 as in FIG. 2 shows a situation where the cartridge 13 designated by the cartridge selecting switch 74 is held in the playing position and is then played. That is, the capstan 42 on the deck 28 abuts against the pinch roller 25 over the tape 23 in the cartridge to drivingly transport the tape with the magnetic head 43 on the deck 28 being slidably in contact with the tape 23. Abutment force between the capstan 42 and the pinch roller 25 is provided by the leaf spring 18 on the container 10 biasedly urging the rear edge of the cartridge 13. A relative position of the cartridge 13 with respect to the capstan 42 and the magnetic head 43 is constantly maintained by the guides 46 and 47 on the deck 28. The rotary disk 67 for the rotary switch 66 is in a position where the conductive piece 68 on the disk shorts contacts of the switch 69 when the cartridge 13 is held in the playing position. Even if the switch 69 is closed, the plunger 33 is not energized by the electrical source 73 since the cartridge selecting switch 74 has been opened. On the other hand, the indicator lamp 78 is not lit since the switch 45 has been actuated and opened by the cartridge 13. Now the cartridge 16 is desired to be played instead of the cartridge 13, the cartridge selecting switch 77 is manually operated and opened. Upon opening the cartridge selecting switch 77, the cartridge selecting switch 74 is closed so that a heavy current from the electrical source 73 is applied through the switch 69 of the rotary switch 66 and the switch 74 to the exciting coil of the plunger 33. Accordingly, the actuator 34 for the plunger 33 is attracted against the bias of the spring, and the actuator is at one end thereof disengaged from the hook portion 32 of the deck 28 to release retention of the deck 28 while the latch lever 38 which is at one end thereof engaged by the flange 36 on the actuator 34 is counterclockwise rotated against the bias of the spring to allow the end 38′ to escape from the notch 19 of the container 10 thus releasing retention of the container 10. The deck 28 which has been released from the plunger 33 is moved from a position as shown to the direction of arrow A by the bias of the tension spring 31 to admit the minimum deformed portion of the cam 59 to abut against the pin 63 on the lever 62. With respect to movement of the deck 28 to the direction of arrow A, the guides 46 and 47 are away from the cartridge 13 and the capstan 42, magnetic head 43, endmark detector 44, and the switch 45 are also away therefrom. As a result, the cartridge is caused to suspend its play. Movement of the deck 28 to the direction of arrow A tensions the belt 65 which has been loosed, and rotation of the capstan 42 is imparted through the belt to the pulley 64 to initiate rotation of the container 10 in the direction of arrow C. Upon rotation of the container 10, the rotary disk is rotated in the direction of arrow as shown and the switch 69 which has been closed by the conductive piece 68 is opened to deenergize the plunger 33.

By engagement of the capstan 42 with the frictional wheel 51, the latter is rotated and rotation thereof is transmitted through the gearing 52, 54, 55 and 58 to the cam 59 to rotate the same in the direction of arrow as shown. Initially, the minimum deformed portion of the cam 59 abuts against the pin 63 on the lever 62, and the portion which engages the pin 63 would be the maximum deformed portion as the cam is further rotated. With further rotation of the cam 59, the deck 28 is gradually moved to the direction of arrow B against the bias of the springs 31.

During movement of the deck 28 in the direction of arrow B, the container 10 is rotated in the direction of arrow C and makes rotation of 90° from the position as shown so that the cartridge 14 is moved to the playing position whereby the end 38′ of the latch lever 38 is opposed to the notch 20 but not interposed in the notch 20 since the switch 70 is closed by the conductive piece 68 on the rotary disk 67 which is rotated synchronously with the container 10 while the cartridge selecting switch 75 has been closed. Accordingly, the container 10 is further rotated and the switch 70 is caused to be opened to deenergize the plunger 33. The container 10 makes rotation of 180° and thus the cartridge 15 (on the broken part in FIG. 1) is moved to the playing position. And, as a result that the switch 71 is closed by the conductive piece 68 on the disk 67 and the cartridge selecting switch 76 has been closed, the plunger 33 is again energized to continue rotation of the container 10 without being prevented from its rotation by the latch lever 38. When the container 10 makes rotation of 270°, the cartridge 16 is moved to the playing position and the switch 72 is closed by the conductive piece 68 on the rotary disk 67. Although the switch 72 has been closed, the plunger 33 is not energized since the cartridge selecting switch 77 has been opened. Therefore, the end 38′ of the latch lever 38 is interposed in the notch 22 (on the broken part in FIG. 1) to arrest rotation of the container 10 and by operation of the cartridge selecting switch 77 the cartridge 16 which is designated to be played is brought to the playing position. Positioning of the cartridge 16 in the playing position is indicated by the indicator lamp 81 to which the current is applied from the electrical source 73 via the switch 72, the exciting coil of the plunger 33, and the switch 45, and which is lit. Since the indicator lamps 78 to 81 are each of high electrical resistance, the current applied from the electrical source 73 to the plunger 33, when the indicator lamp 81 is lit, is too small to actuate the plunger. As a result, the plunger 33 is maintained in non-operative condition.

After the container 10 is suspended from its rotation, the deck 28 has been moved to the direction of arrow B as rotation of the cam 59. When the cam 59 makes approximately one rotation, the deck 28 is moved to the position as shown and the front edge of the cartridge 16 is clamped at the corners thereof between the guides 46, 47 so that a relative position of the cartridge 16 in relation to the deck 28 is in order while the hook portion 32 of the deck engages the actuator 34 of the plunger 33. The cam 59 is rotated to the extent that the maximum deformed portion is away from the pin 63 on the lever 48 to release the cam from the pin 63 terminating movement of the deck 28 in the direction of arrow B at the same time the deck is anchored in the position as shown by the actuator 34 of the plunger 33.

Engagement of the cam 59 with the pin 63 on the lever 62 is released with the swing lever 48 being returned to its original position by the bias of the spring 50 to release the frictional wheel 51 from the capstan 42 whereby the cam 59 is suspended from its rotation at the position as shown. Movement of the deck 28 in the direction of arrow B thus allowing the same to be returned to its original position causes the cartridge 16 to actuate the switch 45 thereby putting off the indicator lamp 81. If the cartridge 16 is not received within the container 10, the switch 45 is not actuated and maintained in closed position with the indicator lamp 81 light on it is determined that the cartridge corresponding to the cartridge selecting switch 77 is not received in the container 10.

As is clear from the foregoing description, by operation of the cartridge selecting switch 77 the cartridge 16 corresponding to the switch is automatically in the playing and thus played.

It will be readily understood that if the cartridge selecting switch 75 is operated the cartridge 14 in place of the cartridge 14 will be in the playing position and thus played in the same manner as in the foregoing. It follows that the cartridge received in the container 10 is selected, as desired, to be played. The period for which the deck 28 is moved to the direction of arrow B by the cam 59 is required, of course, to be longer that for which the designated cartridge is located by rotation of the container 10 in the playing position. Instead of the use of the control device shown in FIG. 2, for instance, a pushbutton switch (not shown) may be operated to energize the plunger 33 in pulse fashion, and the container 10 is automatically suspended from its rotation whenever made of rotation of 90°. It is apparent from this that at each time the pushbutton switch (not shown) is operated, the cartridges 13 to 16 are successively brought to the playing position and thus played. Alternatively, without depending upon the pushbutton switch, the endmark detector 44 which detects a conductive foil (not shown) as endmark attached to the tape 23 may be used. In other words, a pair of insulated feeler contacts for the endmark detector may energize the plunger 33 in relation to shorting of the contacts by the conductive foil (not shown). In this case, reproduction of the tape of the cartridge which has been played in the playing position is completed, the cartridges received in the container 10 are successively played by energizing the plunger 33 whenever the conductive foil (not shown) on the tape is detected by the endmark detector 44.

Figure 3:
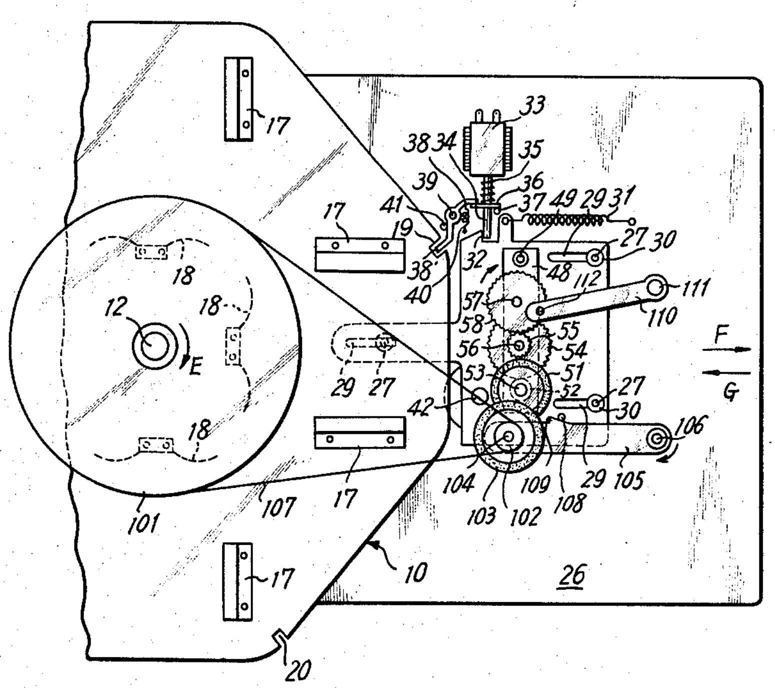
FIG. 3 is a plan view of another embodiment of the tape player utilizing a plurality of endless magnetic tape cartridges, partially broken away.

Another embodiment of the tape player according to the present invention is shown in FIG. 3 wherein similar numerals are used to illustrate like parts in FIG. 1. In FIG. 3, the magnetic head (indicated at 43 in FIG. 1) and the endmark (indicated at 44 in FIG. 1) each to be mounted to the reciprocating deck 28 are not shown for the purpose of simplicity. A driving means for driving the container 10 is mounted to the sleeve 11 common to the container 10 and includes a pulley 101 over the container and of larger diameter, a pulley 102 of smaller diameter rotatably mounted with an idler wheel 103 to an axis 104 on a lever 105 of which one end pivotally mounted to an axis 106, and a belt 107 interposed between the pulleys 101 and 102. The lever 105 is given a rotational force in the direction of arrow as shown but rotation of the lever is limited by a stopper pin 108 on the deck 28. When the deck 28 in a position as shown, an inclined projection 109 of the lever 105 abuts against the stopper pin 108. When the deck 28 is released from the plunger 33 and is moved by the bias of the springs 31 to the direction of arrow F, the stopper pin 108 is away from the inclined projection 109. Thereafter, the lever 105 is slightly moved to the direction of arrow as shown and the idler wheel 103 abuts against the capstan 42 to allow the idler wheel to be drivingly rotated by the capstan 42. Rotation of the idler wheel 103 is transmitted through the pulley 120, the belt 107, the pulley 101, and the sleeve 11 to the container 10 to rotate the latter in the direction of arrow E. Rotation of the container 10 is controlled in relation to operation of the plunger 33 as in the same manner of the player in FIG. 1. During drivingly rotation of the idler wheel 103 by the capstan 42, the container 10 is suspended from its rotation by the latch lever 38, and the belt 107 is slipped to the pulleys 101 and 102. When the deck 28 is moved to the direction of arrow G and back to the position as shown, the stopper pin 108 comes in contact with the inclined projection 109 of the lever 105 to counterclockwise rotate the lever 105 and move the same to the position as shown so that the idler wheel 103 is away from the capstan 42.

Although the driving means for moving the deck 28 in the embodiment in FIG. 1 includes the cam 59, according to the embodiment in FIG. 3, a driving means for moving the deck 28 includes an arm 110 which, instead of the cam 59 (FIG. 1) has one end swingably mounted to an axis 111 on the base plate 26 and the other pivotally connected to a pin 112 provided away from the center of the gear 58. When the deck 28 is released from the plunger 33 and moved by the bias of the tension springs 31 to the direction of arrow F, the swing lever 48 is moved with the deck 28 on one hand and movement of the gear 58 is prevented by the arm 110 on the other hand so that the swing lever 48 is clockwise rotated around the axis 49 to allow the frictional wheel 51 to abut against the capstan 42. Accordingly, the frictional wheel 51 is rotated by rotation of the capstan 42 to initiate rotation of the gear 58 in the direction of arrow as shown. With the gear 58 initiates its rotation, the deck 28 is gradually moved to the direction of arrow F and further moved to a position farthest away from the container 10 as the gear 58 makes half rotation. As the gear 58 is further rotated, movement of the deck 28 is reversed to the direction of arrow G. Prior to completion of one rotation of the gear 58 from the position as shown, the deck 28 is moved in proximity of the container, and thus allowing the actuator 34 of the plunger 33 to engage the hook portion 32 of the deck. Further rotation of the gear 58 provides a movable force in the direction of arrow F for the deck 28, and the deck 28 is not moved since it is engaged by the actuator 34 of the plunger 33 so that the swing lever 48 is counterclockwise swung to keep the frictional wheel 51 away from the capstan 42 stopping rotation of the gear 58 as shown in FIG. 3.

In the tape player in FIG. 3 as in the case of that shown in FIG. 1, the cartridges (not shown) received in the container 10 each are brought to the playing position and thus played.

Figure 4:
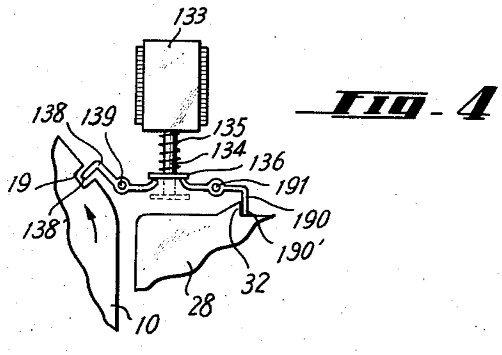
FIG. 4 is a representation showing a further latch means different from that in FIGS. 1 and 4 for the container and reciprocating deck.

FIG. 4 shows another latch means for the container 10 and the deck 28, which is different from that shown in FIG. 3. In FIG. 4, similar numerals are used to illustrate like parts in FIGS. 1 and 3. Numeral 133 indicates a plunger which corresponds to the plunger 33 (FIGS. 1 and 2) and which is provided with an actuator 134 having a flange 136. The actuator 134 is adapted to extend to a position shown by the dotted line by the bias of a spring 135 when the plunger 133 is not energized and to be in a position shown by the solid line when the plunger is energized. A latch lever 138 is similar to the latch lever 38 (FIGS. 1 and 3) and pivotally mounted by a pin 139 to the base plate 26 (FIGS. 1 and 3). The latch lever 138 is biased by a spring (not shown) in the direction of arrow as shown and engages the flange 136.

Numeral 190 designates a second latch lever which engages the hook portion 32 of the deck 28 to effect retention of the deck 28 and which is pivotally mounted by a pin 191 to the base plate 26 (FIGS. 1 and 3). The latch lever 190 is biased by a spring (not shown) in the direction of arrow as shown and engages the flange 136. The latch means shown in FIG. 4 is different from that in FIGS. 1 and 3 and is such that the end 138' of the latch lever 138 is interposed in the notch 19 to engage the container 10 while the end 190' of the second latch lever 190 engages the hook portion 32 of the deck 28 to hold the deck 28 when the plunger 133 is energized. When the plunger 133 is deenergized, the actuator 134 is returned by the bias of the spring 135 to a position shown by the dotted line so that the latch lever 138 is clockwise rotated by the flange 136 and the latch lever 190 is counterclockwise rotated to release retention of the container 10 and the deck 28 thereby moving those in the direction of arrow as shown. Control for current supply to the plunger 133 may be made by a control device similar to the control device shown in FIG. 2. In this case, the control device is required to use such cartridge selecting switches which are operated in a relationship reverse to the cartridge selecting switches 74 to 77. The cartridge selecting switches 74 to 77 are such that one operated is opened and the others are closed. To the contrary, the cartridge selecting switches used for controlling current supply to the plunger 133 are such that one operated is closed and the others are opened.

By the use of the latch means shown in FIG. 4, a power switch of the tape player is put off to bring the tape player in non operative condition and the plunger 133 is deenergized to keep the deck 28 away from the container 10 so that advantage is such that the capstan 42 is positively away from the pinch roller 25 within the cartridge when the tape player is in non operative position whereby deformation of the pinch roller is prevented as in the case of the capstan being forced to abutment with the pinch roller for long period.

It will be appreciated that the invention is not limited to use of the particular construction illustrated, but includes variants and alternatives within the spirit and scope of the claims.

What is claimed is:

1. A tape player utilizing a plurality of endless magnetic tape cartridges, comprising:

a rotatably provided container having a plurality of receptacles which radially accommodate a plurality of the cartridges therein in a planar array about the axis of rotation of said container such that the front edge of the cartridge projects at least from the periphery of the container;

driving means for rotating said container for consecutively positioning said cartridges at a playing position; container latch means for retaining said container at a position where a cartridge is at said playing position;

a slidable reciprocating deck carrying reproducing members including a capstan, and magnetic head for playing the cartridge in said playing position and movable in the plane of said cartridges toward and away from said front edge of a cartridge disposed in said playing position for respectively operatively engaging and disengaging the tape in said cartridge disposed in the playing position with said reproducing members, said deck being operable to be moved toward said front edge of a cartridge disposed in said playing position when said container is retained by said container latch means; at least one tension spring biasing said reciprocating deck in the direction away from said container; deck latch means for retaining the deck against the bias of said tension spring at a position where said cartridge in said playing position is played by said reproducing members;

an electromagnetic plunger having an actuator, a supply of current for said plunger, said actuator being operable to be reciprocated in pulse fashion by control of the current supply to said plunger; means in said container latch means and said deck latch means engageable with said actuator, said container latch means and said deck latch means being operable to retain said container and deck, respectively, when said engageable means are engaged by said actuator; a control circuit for controlling the current supply to said electromagnetic plunger to actuate the same in pulse fashion such that said container latch means releases retention of said container and said deck latch means releases retention of said reciprocating deck, said reciprocating deck being moved by the bias of said tension spring in the direction away from the cartridge in said playing position when said deck latch means releases retention of said deck and said container being operable to be rotated by said driving means when said container latch means releases retention of said container; deck moving means for moving said reciprocating deck against the bias of said tension spring toward a cartridge in the playing position, said deck moving means including a swing lever swingably mounted on said deck, a frictional wheel rotatably provided on said swing lever, a rotary member rotatably mounted on said swing lever, speed reducing transmission means for transmitting the rotation of said frictional wheel at a reduced speed to said rotary member, and a stopping member for limiting movement of said rotary member when said deck is moved by the bias of said tension spring, said stopping member being operable when said deck is moved away from the playing position by the bias of said tension spring to swing said swing lever in the direction where said frictional wheel abuts against said capstan and is drivingly rotated thereby, said rotary member, when rotated by said frictional wheel, being operable in cooperation with said stopping member to move the deck against the bias of said tension spring to a position where said deck is retained by said deck latch means.

2. A tape player utilizing a plurality of endless magnetic tape cartridges in accordance with claim 1, wherein said rotary member is a cam, and said stopping member is a stopper pin which is provided opposed to said cam and against which said cam abuts when said reciprocating deck is moved away from a cartridge in the playing position by the bias of said tension spring.

3. A tape player utilizing a plurality of endless magnetic tape cartridges in accordance with claim 1, wherein said stopping member is an arm having one end pivotally mounted to a portion away from the center of rotation of said rotary member and the other end pivotally mounted to a fixed point relative to said rotary member.

4. A tape player utilizing a plurality of endless magnetic tape cartridges in accordance with claim 1, wherein said control circuit comprises, in series connection a rotary switch means rotatable in synchronism with said container, cartridge selecting switches corresponding in number to the cartridges within said container for designating the cartridge to be played, said electrical source for supplying energy with said electromagnetic plunger, and said electromagnetic plunger, and said control circuit being operable in association with one cartridge selecting switch operated to designate the cartridge to be played and with said rotary switch means to maintain said plunger in non operative condition, whereby said container latch means retains said container at a position where said designated cartridge is carried at said playing position while said deck latch means retains said reciprocating deck.

5. A tape player utilizing a plurality of endless magnetic tape cartridges in accordance with claim 4, wherein said rotary switch means consists of rotary disk of insulating material connected with said container, a conductive piece provided on said rotary disk, and switches including a pair of electrically separated contacts and equally spaced with respect to said rotary disk corresponding to the number of said receptacles of said container and being operable to be successively closed by said conductive piece with rotation of said rotary disk, each of said switches being individually connected to each of said cartridge selecting switches.

6. A tape player utilizing a plurality of endless magnetic tape cartridges in accordance with claim 5, wherein said cartridge selecting switches are so arranged that when one of them is opened for designating said cartridge to be played the remainders are closed.

7. A tape player utilizing a plurality of endless magnetic tape cartridges in accordance with claim 1, wherein said means in said container latch means engageable with said actuator includes a swingable lever having one end adjacent said container to be interposed in one of a plurality of notches formed in said container, said means in said deck latch means engageable with said actuating lever includes a swingable lever having one end engageable with a hook portion provided on said reciprocating deck, said swingable levers each being coupled to said actuator for said electromagnetic plunger, said one end of said container latch means swing lever being interposed in one of said notches to retain said container when said plunger is energized, and said deck latch means swing lever being engaged with said hook portion to retain said reciprocating deck said plunger is deenergized by said control circuit, said swing levers each being operable to be swung to release retention of said container and said reciprocating deck.

8. A tape player utilizing a plurality of endless magnetic tape cartridges in accordance with claim 4, wherein said driving means for rotating said container includes a belt driving mechanism transferring rotation of said capstan to said container when said reciprocating deck is moved away from said cartridge in the play position by the bias of said tension spring.

* * * * *